US008028050B2

(12) United States Patent
Italiano et al.

(10) Patent No.: US 8,028,050 B2
(45) Date of Patent: Sep. 27, 2011

(54) RESTORATION FOR VIRTUAL PRIVATE NETWORKS

(75) Inventors: Giuseppe F. Italiano, Rome (IT); Rajeev Rastogi, New Providence, NJ (US); Bulent Yener, Chatham, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2597 days.

(21) Appl. No.: 10/462,215

(22) Filed: Jun. 13, 2003

(65) Prior Publication Data

US 2004/0255049 A1 Dec. 16, 2004

(51) Int. Cl.
*G06F 15/177* (2006.01)
*G06F 15/173* (2006.01)

(52) U.S. Cl. ........................................ 709/223; 709/220

(58) Field of Classification Search .................. 709/250, 709/239, 241, 242, 220, 223
See application file for complete search history.

(56) References Cited

U.S. PATENT DOCUMENTS

| | | | |
|---|---|---|---|
| 6,097,722 A * | 8/2000 | Graham et al. | 370/395.21 |
| 6,311,288 B1 * | 10/2001 | Heeren et al. | 714/4 |
| 6,331,986 B1 * | 12/2001 | Mitra et al. | 370/468 |
| 6,912,232 B1 * | 6/2005 | Duffield et al. | 370/468 |
| 7,082,101 B2 * | 7/2006 | Kim et al. | 370/225 |
| 7,155,120 B1 * | 12/2006 | Ofek et al. | 398/7 |
| 2002/0055989 A1 * | 5/2002 | Stringer-Calvert et al. | 709/220 |
| 2003/0088698 A1 * | 5/2003 | Singh et al. | 709/239 |
| 2004/0133619 A1 * | 7/2004 | Zelig et al. | 709/200 |

* cited by examiner

*Primary Examiner* — Kristie D Shingles
(74) *Attorney, Agent, or Firm* — Ryan, Mason & Lewis, LLP (57) ABSTRACT

Restoration is provided in a communication system having two or more VPN endpoints coupled together through a network comprising a number of nodes interconnected through edges. VPN endpoints coupled through the network are adapted to communicate through a single connection with multiple other VPN endpoints. The single connection may be a VPN hose connection. A restoration topology, comprising backup edges corresponding to primary edges in the network, is determined for the network. A given primary edge is replaced with one or more backup edges if the given primary edge fails. A graph may represent the network and a tree may represent the connections in the network for VPNs connecting the VPN endpoints. The graph can be reduced to a second graph by determining shortest paths between each node in the tree and creating the backup edges from the shortest paths. The second graph can be reduced to a third graph by adding additional backup edges from tree nodes having non-tree edges to least common ancestor nodes. The third graph can be used to create a two-edge connected tree.

15 Claims, 9 Drawing Sheets

| SYMBOL | DESCRIPTION |
|---|---|
| $G = \langle V, E \rangle$ | GRAPH WITH NODES $V$ AND *BIDIRECTIONAL* EDGES $E$ |
| $V(G), E(G)$ | NODE AND EDGE SET OF GRAPH $G$, RESPECTIVELY |
| $e = (u, v)$ | EDGE $e$ THAT CONNECTS NODES $u$ AND $v$ |
| $W \subseteq V$ | SET OF VPN NODES |
| $D_{|W| \times |W|}$ | PAIRWISE TRAFFIC MATRIX SUCH THAT $\forall i \in W \sum_j d_{i,j} \leq B_i$ AND $\sum_j d_{j,i} \leq B_i$ |
| $T \subseteq G$ | A VPN TREE THAT CONNECTS THE NODES IN SET $W$ |
| $T_u, T_v$ | SUBTREES OBTAINED FROM DELETING PRIMARY EDGE $e = (u, v) \in T$ |
| $B_i$ | BOUND ON THE AGGREGATE BANDWIDTH REQUEST OF NODE $i \in W$ |
| $BT_u, BT_v$ | TOTAL BANDWIDTH IN $T_u$ AND $T_v$: $BT_u = \sum_{i \in W \cap T_u} B_i$ AND $BT_v = \sum_{i \in W \cap T_v} B_i$ |
| $b_e$ | AMOUNT OF BANDWIDTH RESERVED ON $e \in E(T)$: $b_e = \min\{BT_u, BT_v\}$ |
| $\pi_T(i, j)$ | THE UNIQUE PATH ON $T$ BETWEEN NODES $i$ AND $j$ |
| $\pi(i, j)$ | THE BACKUP PATH TO CONNECT $i$ AND $j$ IF ANY LINK $e \in \pi_T(i, j)$ FAILS |
| $\pi_e \in G - T$ | BACKUP PATH FOR A PRIMARY EDGE $e \in T$ |
| $B(\pi_e)$ | BANDWIDTH RESERVATION ON THE BACKUP PATH $\pi_e$ |
| $T'(\pi_e)$ | $(T \cup \pi_e) - \{e\}$ |

FIG. 2 cont.

| | |
|---|---|
| $P(f)$ | SET OF EDGES IN $T$ FOR WHICH $f \in G - T$ IS A CANDIDATE BACKUP EDGE |
| $\mathcal{P}(f)$ | SET OF EDGES IN $T$ FOR WHICH $f \in G - T$ IS A BACKUP EDGE (i.e., $f \in \pi_e$ FOR $e \in T$) |
| $B(f)$ | REQUIRED BANDWIDTH RESERVATION OF $f$: $B(f) = \max_{e \in \mathcal{P}(f)} \{B(e)\}$ |
| $B(e)$ | NEW BANDWIDTH RESERVATION NEEDED ON EDGE $e \in T \cap T'(\pi_e)$ |
| $\delta b_e$ | $\|B(e) - b_e\|$ FOR $e \in T \cap T'(\pi_e)$ |

| | |
|---|---|
| $A$ | AN AUGMENTATION OF $T$ IN $G$: $A = \{f \in G - T \mid \exists \mathcal{P}(f) \forall e \in T\}$ |
| $A^*$ | OPTIMAL AUGMENTATION OF $T$ |
| $w(\pi_e)$ | COST OF BACKUP PATH $\pi_e$ |
| $w(A)$ | COST OF $A$ (i.e., TOTAL BANDWIDTH NEEDED BY $A$): $w(A) = \sum_{f \in A}(B_f)$ |

SEGMENTS: (A-B) (A-D) (A-E) (B-D) (B-E) (D-E)

RESTORATION FOR VIRTUAL PRIVATE NETWORKS

FIELD OF THE INVENTION

The present invention relates generally to communication over networks, and, more particularly, to communication using virtual private networks (VPNs).

BACKGROUND OF THE INVENTION

In recent years, there has been interest in offering VPN services over the public Internet. An important goal has been to provide performance guarantees in the VPN context comparable to those associated with private wide-area networks (WANs). The first generation internet protocol (IP) based VPN technology mainly focused on security and tunnel-based routing, but fell short of providing any quality of service (QoS) guarantees. However, the recent emergence of certain IP technologies, such as multiprotocol label switching (MPLS), enhances the Internet infrastructure to provide services suitable for QoS improvements. Thus, the problem of provisioning VPN services with QoS guarantees has become an active area of research.

The "pipe" model and the "hose" model are two popular models for providing QoS in the context of VPNs.

In the pipe model, the VPN customer specifies QoS requirements between every pair of VPN endpoints and each endpoint is connected only to a single other endpoint. Thus, the pipe model requires the customer to know the complete traffic matrix, specifying the traffic load between every pair of endpoints.

However, as the number of endpoints grows and as the connectivity dynamics increase, it may be difficult to achieve bandwidth requirements between the endpoints. Thus, algorithms for establishing VPNs have begun to resort to models with aggregate bandwidth demands, such as the hose model. See, for instance, Duffield et al., "A Flexible Model for Resource Management in Virtual Private Networks," Proceedings of Association for Computing Machinery (ACM) Special Interest Group on Communications (SIGCOMM) (1998), the disclosure of which is hereby incorporated by reference.

In the hose model, one VPN endpoint can communicate with multiple additional VPN endpoints through a single connection, and each VPN endpoint specifies its aggregate ingress and egress bandwidth requests. The ingress bandwidth for a VPN endpoint specifies the incoming traffic from all the other VPN endpoints into the VPN endpoint, while the egress bandwidth is the amount of traffic the VPN endpoint can send to the other VPN endpoints. The hose model is scalable since the customer manages the allocated bandwidth at per flow basis at the network edge while the VPN provider, which sets up the network, is concerned only with the flow aggregates inside the network.

A problem with the hose model is that failure of an edge within the network can cause multiple VPN endpoints to lose communication. A need therefore exists for restoration techniques for networks that allow a single VPN endpoint to communicate with multiple additional VPN endpoints.

SUMMARY OF THE INVENTION

The present invention provides techniques for performing restoration in VPNs.

In an aspect of the invention, techniques are presented that provide restoration in a communication system having two or more VPN endpoints coupled together through a network. The network comprises a number of nodes interconnected through edges. One or more of the VPN endpoints are adapted to communicate with multiple VPN endpoints through a single connection. The single connection is generally a VPN hose connection. A restoration topology is determined for the network. The restoration topology comprises backup edges corresponding to primary edges in the network. A given primary edge is replaced with one or more of the backup edges if the given primary edge fails.

In another aspect of the invention, the restoration topology for the network is determined by using a network portion describing primary edges and primary nodes in the network. The primary edges and primary nodes are used to connect the one or more VPN endpoints with other VPN endpoints. Additionally, the network comprises a number of non-primary nodes and non-primary edges.

In another aspect of the invention, shortest paths are determined between pairs of primary nodes in the network portion. The shortest paths use non-primary edges and are converted into corresponding ones of the backup edges. Weights can be assigned to each backup edge. The weights may be assigned by determining, for each shortest path, how many non-primary edges in the graph the shortest path traverses from one primary node to another primary node. Then a weight is a number of non-primary edges the shortest path traverses from one primary node to another primary node. These steps can be considered to perform a reduction of a graph comprising information about nodes and edges in the network to a second graph. The second graph can be considered to represent a modified version of the network.

In another aspect of the invention, a root node of the network portion is determined. Generally, the root node is chosen such that any sequence of edges in the network portion from the root to any node in the network portion has a property that bandwidth in the sequence decreases. Additional backup edges may be created for non-primary edges in the graph, where each of the additional backup edges connect a primary node coupled to a non-primary edge with one or more least common ancestor nodes in the network portion. The non-primary edge may be deleted, and a cost assigned to the additional backup edges. These steps can be considered to reduce a graph representing a modified version of the network to another graph. When performed on the second graph, a third graph is determined. The third graph represents a further modified version of the network.

In another aspect of the invention, a two-edge connected network portion is determined from a graph of a network. Generally, the graph used to determine the two-edge connected network portion is the third graph. The two-edge connected network portion is a complete restoration topology allowing restoration for any single primary edge in the original network portion.

BRIEF DESCRIPTION OF THE DRAWINGS

FIG. 4A illustrates an augmentation of a VPN tree without sharing backup paths, while

FIG. 5A illustrates an initial graph before backup edges are added, while

FIG. 6A illustrates a tree prior to partitioning, while

DETAILED DESCRIPTION

For ease of reference, the present disclosure is divided into the following sections: Introduction; Model and Definitions; and Approximation Methods Providing Restoration in VPNs.

Introduction

Failure of any edge in a network having a number of VPNs interconnected by using VPN pipes would disrupt the service unless a backup path was established to reconnect VPNs lost when primary edges in the network fail. A restoration technique, such as the techniques described herein, selects a set of backup paths and allocates necessary bandwidth on them in advance, so that the traffic disrupted by failure of a primary edge can be re-routed via backup paths.

Figure 1:
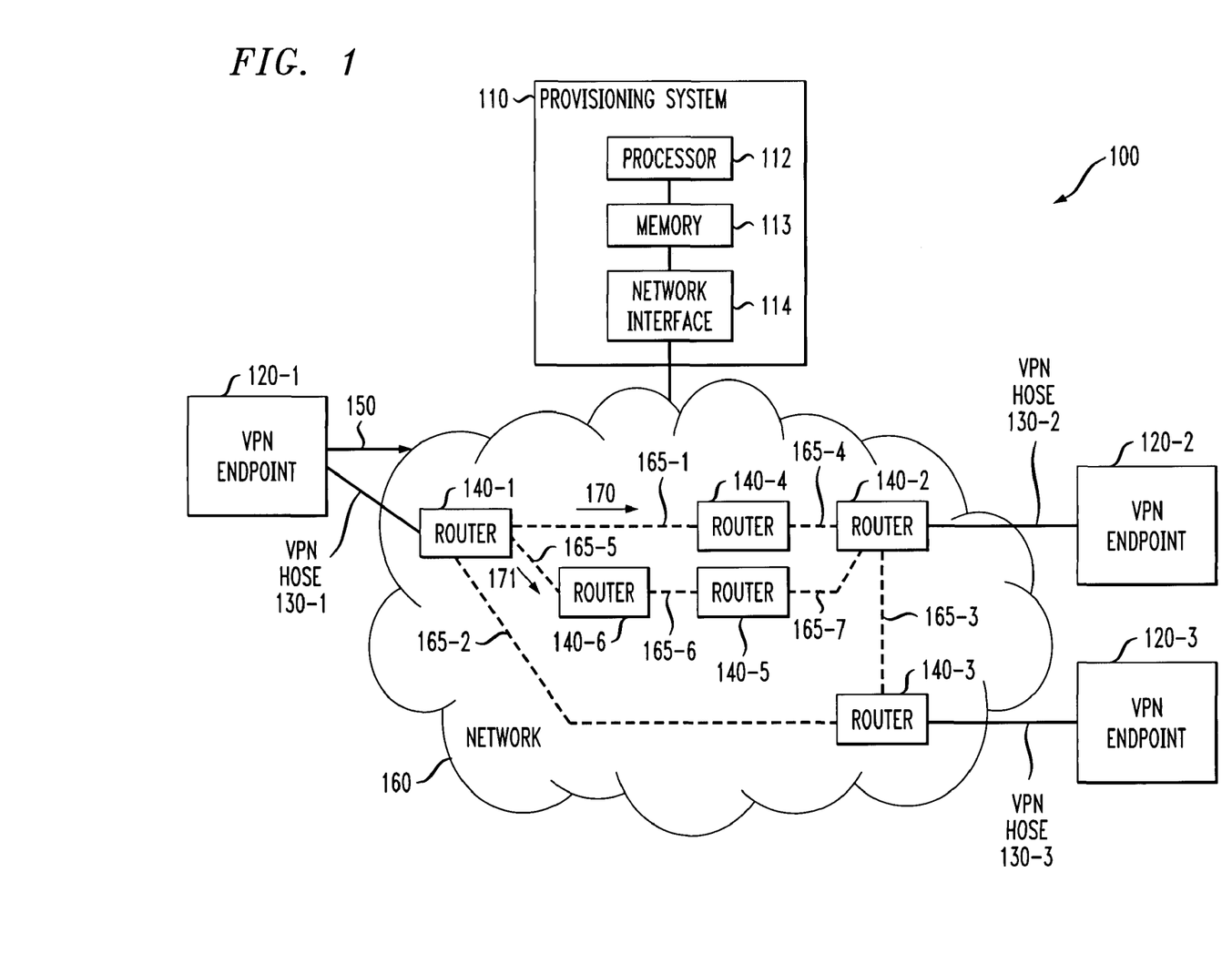
FIG. 1 illustrates a block diagram of an exemplary communication system adapted to provide restoration in VPNs, in accordance with a preferred embodiment of the invention.

Turning now to FIG. 1, a communication system 100 is shown. Communication system 100 comprises a provisioning system 110 coupled to three VPN endpoints 120 through a network 160. Each VPN endpoint 120 is coupled to the network 160 through VPN hose connections 130. Each VPN hose connection 130 is a single connection that allows a respective one of the VPN endpoints 120 to communicate with multiple VPN endpoints 120. For instance, VPN endpoint 120-1 can communicate through VPN hose connection 130-1 to both VPN endpoint 120-2 and VPN endpoint 120-3. Each VPN hose connection 130 is coupled to a router 140 that is controlled by provisioning system 110.

Network 160 comprises four routers 140-1 through 140-4 (e.g., primary nodes) and four primary edges 165-1 through 165-4 in this simple example. Network 160 also comprises backup edges 165-5 through 165-7, which are routed through backup routers 140-5 and 140-6. Each of the routers 140 are referred to as nodes herein, as a node is a point at which data can be routed via one or more edges to one or more nodes. Routers 140 are shown as nodes, although any device suitable for passing data to another device.

Provisioning system 110 comprises a processor 112, a memory 113, and a network interface 114. Although only a single processor 112, memory 113, and network interface 114 are shown, the provisioning system 110 can include multiple processors 112, memories 113, and network interfaces 114. Provisioning system 110 controls certain properties of the network 160, including the properties of reserving bandwidth on edges 165, setting up edges 165, modifying routers 140 if necessary to control edges 165, and performing other network functions. The processor 112 executes one or more programs (not shown) in order to implement the techniques of the present invention. Network interface 114 couples the provisioning system 110 to the network 160. Network 160 may comprise a number of subnetworks (not shown), which may be connected to multiple network interfaces 114.

As is known in the art, the network 160 can be represented by a graph having information representing some or all of the nodes and edges in the network 160. Graphs are described in additional detail below. A graph is a model of the network 160 and any technique for modeling the network 160 may be used as a graph, such as a linked list or doubly linked list. Furthermore, it is beneficial to model the graph or a portion thereof as a tree, which is a portion of the graph but is structured in the sense that a tree has leaves, branches, and a root. In an illustrative embodiment detailed below, a tree is used to represent, at least initially, the primary nodes (e.g., routers 140) and edges 165 in network 160. It has been shown that a tree is an optimum topology when ingress and egress bandwidth requests are symmetrical throughout a graph. See, e.g., Kumar et al., "Algorithms for Provisioning Virtual Private Networks in the Hose Model," in Proc. Association for Computing Machinery (ACM) Special Interest Group on Communications (SIGCOMM) (2001). Exemplary trees are described below.

As described in the techniques presented below, the provisioning system 110 will generally model the network 160 as a graph and one or more trees in order to create a restoration topology for the network 160. Generally, the VPNs in the network 160 will be modeled by a VPN tree, which contains primary nodes and primary edges 165 used to carry data to support the VPNs or having bandwidth reserved on the primary nodes and primary edges 165 to support the VPNs. The network 160 will contain additional nodes and edges 165 that are not used to carry data to support the VPNs or do not have bandwidth reserved on the nodes and edges 165 to support the VPNs. Some of these additional nodes and edges 165 will be used as backup nodes and backup edges 165.

Thus, in FIG. 1, the routers 140-1 through 140-4 are primary nodes of a VPN tree, and edges 165-1 through 165-4 are primary edges. A graph contains these primary nodes and primary edges, along with routers 140-5 and 140-6 and edges 165-5, 165-6 and 165-7.

VPN endpoints 120 can send requests for a VPN to the provisioning system 110. For instance, VPN endpoint 120-1 can communicate, through connection 150 for example, a request for a VPN so that VPN endpoint 120-1 can communicate through a VPN to VPN endpoint 120-2. The provisioning system 110 system would determine backup edges in order to restore the network 160 in case of one or more primary edge failures and provision bandwidth in order to provide the backup edges. In the example of FIG. 1, the backup edges 165-5 through 165-7 are provisioned such that bandwidth is reserved on these edges. The primary edges 165-1 and 165-4 contain all the network data passing between the VPN endpoint 120-1 and the VPN endpoint 120-2. Alternatively, bandwidth may be shared between through two paths. For example, the path 170 having edges 165-1 and 165-4 could have reserved on it a portion of the bandwidth between VPN endpoints 120-1 and 120-2, while the path 171 having edges 165-5 through 165-7 could have reserved on it the rest of the bandwidth. Similarly, each path 170, 171 could have bandwidth reserved on the path for backup purposes. If the path 170 fails, the path 171 would then be the primary path for data. Backup edges corresponding to primary edges 165-2 and 165-3 are not shown.

The provisioning system 110 may include a database (not shown), stored in memory 113, in order to determine through which edges 165 bandwidth is reserved and to which nodes 140 the edges 165 are coupled.

The techniques described herein may be implemented through hardware, software, firmware, or a combination of these. Additionally, the techniques may be implemented as an article of manufacture comprising a machine-readable medium, as part of memory 113 for example, containing one or more programs that when executed implement embodiments of the present invention. For instance, the machine-readable medium may contain a program configured to perform some or all of the steps of the present invention. The machine-readable medium may be, for instance, a recordable medium such as a hard drive, an optical or magnetic disk, an electronic memory, or other storage device.

The present disclosure presents restoration techniques that can be used, for example, to maintain a VPN tree in the hose model with symmetric bandwidth requests under transient edge failures. Namely, in one embodiment, it is assumed that an edge failure in the network 160 is repaired before the next one is presented, which is realistic in many situations. One possible approach for restoration would be to build a pair of edge-disjoint VPN trees so that if the primary VPN tree gets disconnected then the backup VPN tree would be used. However, this approach would be wasteful under a single edge failure model, since a backup path can be used to recover from the failure of multiple primary edges. A backup path is a series of one or more backup edges. Thus, a restoration technique should consider sharing of the backup paths. However, as is shown below, bandwidth reservation on the backup paths complicates the problem further than simply minimizing the number of backup edges used in the backup paths.

The rest of the disclosure is organized as follows. First, several cost functions are introduced and trade-offs among them are shown. The cost functions include minimizing the total bandwidth reserved on the backup paths, minimizing the disruption in the VPN tree edges, minimizing the total additional bandwidth reservation needed in the network. Next, an objective function is described that minimizes total bandwidth on the backup paths. This problem is referred to as an optimal augmentation of a VPN tree and the optimal augmentation is a variant of the optimal graph augmentation problem, which is NP-complete. A polynomial time approximation method, which gives solutions that are provably at most 16 times the optimum, is described.

In an aspect of the present invention, the optimal augmentation problem is reduced to an edge connectivity augmentation problem in two reductions. In the first reduction, an original graph G, which represents network 160, is reduced to produce a graph G' which has no complications arising from path sharing as the paths are disjoint. Both the graph, G, and the VPN tree, T, are assumed to be known. As used herein, the term "tree" is considered to include, by way of example and without limitation, a VPN tree. The graph G' is obtained from G by replacing entire backup paths with disjoint backup edges, which costs an approximation factor of 8. The backup edges are usually determined by finding shortest paths between nodes in the tree. Finding an optimal augmentation for G' is still difficult but possible through the disclosed techniques.

The graph G' is then reduced to another graph Ĝ containing only certain types of non-tree edges, and is reduced such that the cost of each backup edge can be computed more easily. This reduction costs another approximation factor of two. The reduction from G' to Ĝ is generally performed by determining a root of the tree, where the root is a node having the property that following any path from the root causes the bandwidth on edges to decrease. For non-tree edges in the graph G', edges are added between a tree node connected to a non-tree edge and a least common ancestor. If there is a non-tree edge in G' between two particular nodes, the non-tree edge is replaced with two backup edges to the least common ancestor node, which is a node that is an ancestor to both of the particular nodes of the tree, and to intervening nodes between the least common ancestor nodes and the particular nodes. Additionally, a cost is usually determined for each added backup edge. In an exemplary embodiment, the cost is a weight of the edge times the maximum bandwidth for any edge that is on a path from the node to the least common ancestor. The graph Ĝ is then used to determine a two-edge connected tree.

Model and Definitions

An undirected graph, G=(V,E), is provided with a set of terminals $W \subset V$ between which communication is to be established using a network. Let n and m denote the number of nodes and edges, respectively, in G. It is assumed that each terminal i∈W has an upper bound $B_i$ on the amount of traffic that can be either sent (i.e., egress bandwidth) or received (i.e., ingress bandwidth) by i at any point. Thus, for each terminal the ingress bandwidth equals the egress bandwidth. A valid traffic matrix D on W is an assignment of a demand $d_{i,j}$ to each pair of terminals that respects the upper bounds. In other words, for any i, the following are true:

$$\sum_j d_{i,j} \le B_i$$

and $$\sum_j d_{i,j} \le B_i.$$

There is also given a VPN tree $T \subset G$ that is able to support any set of traffic demands respecting those upper bounds. Namely, each tree edge e∈T has a bandwidth reservation $b_e$ such that the demands corresponding to any valid traffic matrix D can be routed along T. In other words, let $\pi_{i,j}$ be the tree path between terminals i and j; then $$\sum_{i,j:e \in \pi_{i,j}} d_{i,j} \le b_e.$$

Edges in the VPN tree are called primary edges and their reserved bandwidth is called primary bandwidth.

As previously described, the present disclosure addresses the problem of maintaining a VPN tree in the transient edge failure model. In this model, it is assumed that network edges can fail, but an edge failure is repaired before the next one is presented. A set of backup paths is chosen to cope with the failure of any primary edge. Illustratively, a set of backup paths are selected, and backup bandwidth allocated on those backup paths, so that when a primary edge e fails, the traffic demands routed on e can be re-routed on the backup paths.

Figure 2:
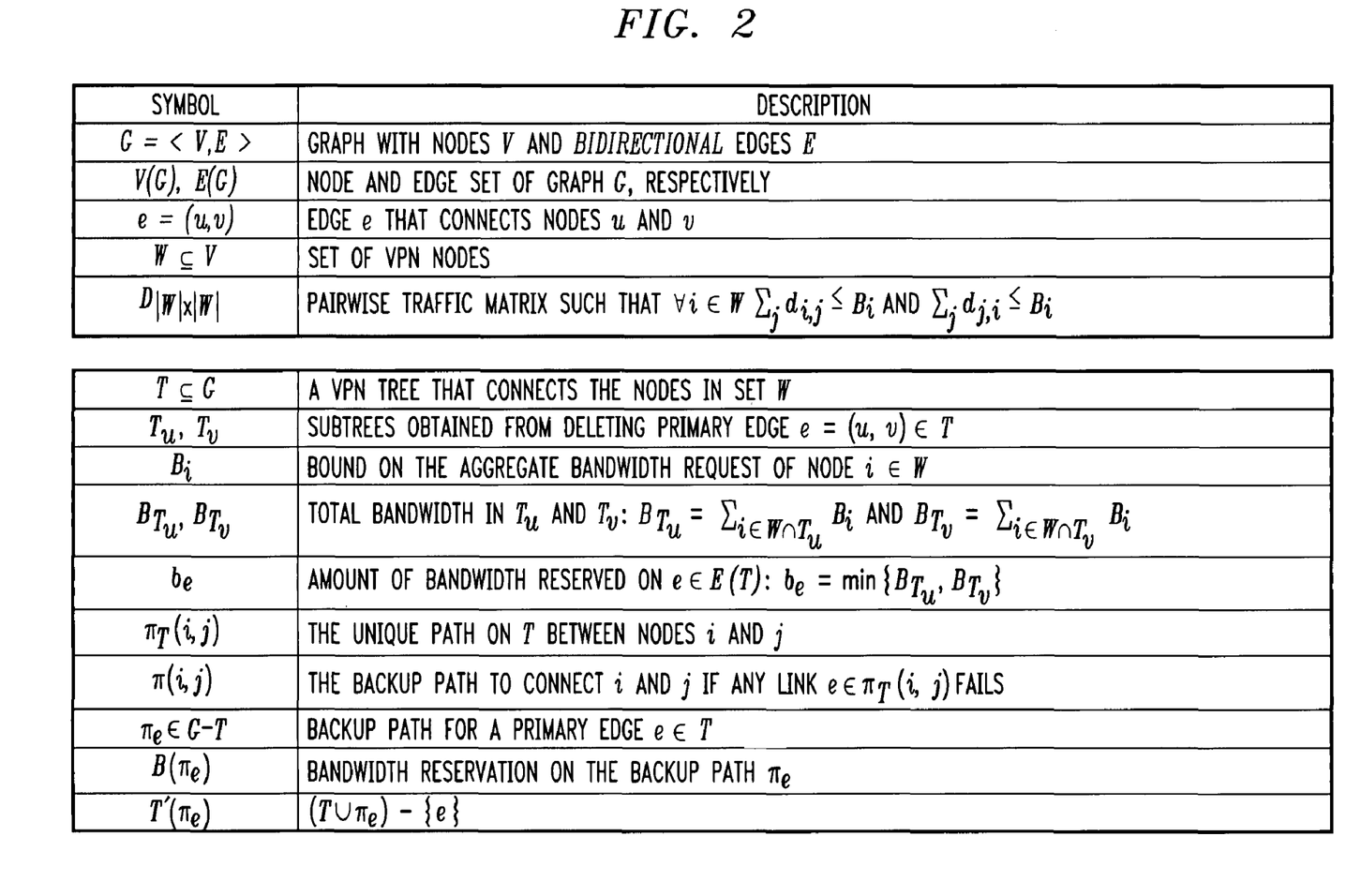
FIG. 2 is a chart of notation used herein.

A few more definitions are beneficial for understanding the present invention. For the sake of clarity, FIG. 2 summarizes the notation used throughout the present disclosure.

Given a tree T, and an edge e=(u,v)∈T, let $T_u$ and $T_v$ be the two trees obtained after deleting e, with ∈$T_u$ and v∈$T_v$. Let $B_{T_u}$ and $B_{T_v}$ be the sums of (ingress) bandwidths for the terminals in the two trees, i.e., $$B_{T_u} = \sum_{i \in W \cap T_u} B_i$$

and $$B_{T_v} = \sum_{i \in W \cap T_v} B_i.$$

Then the bandwidth requirement for edge e is $b_e = \min\{B_{T_u}, B_{T_v}\}$.

Figure 3:
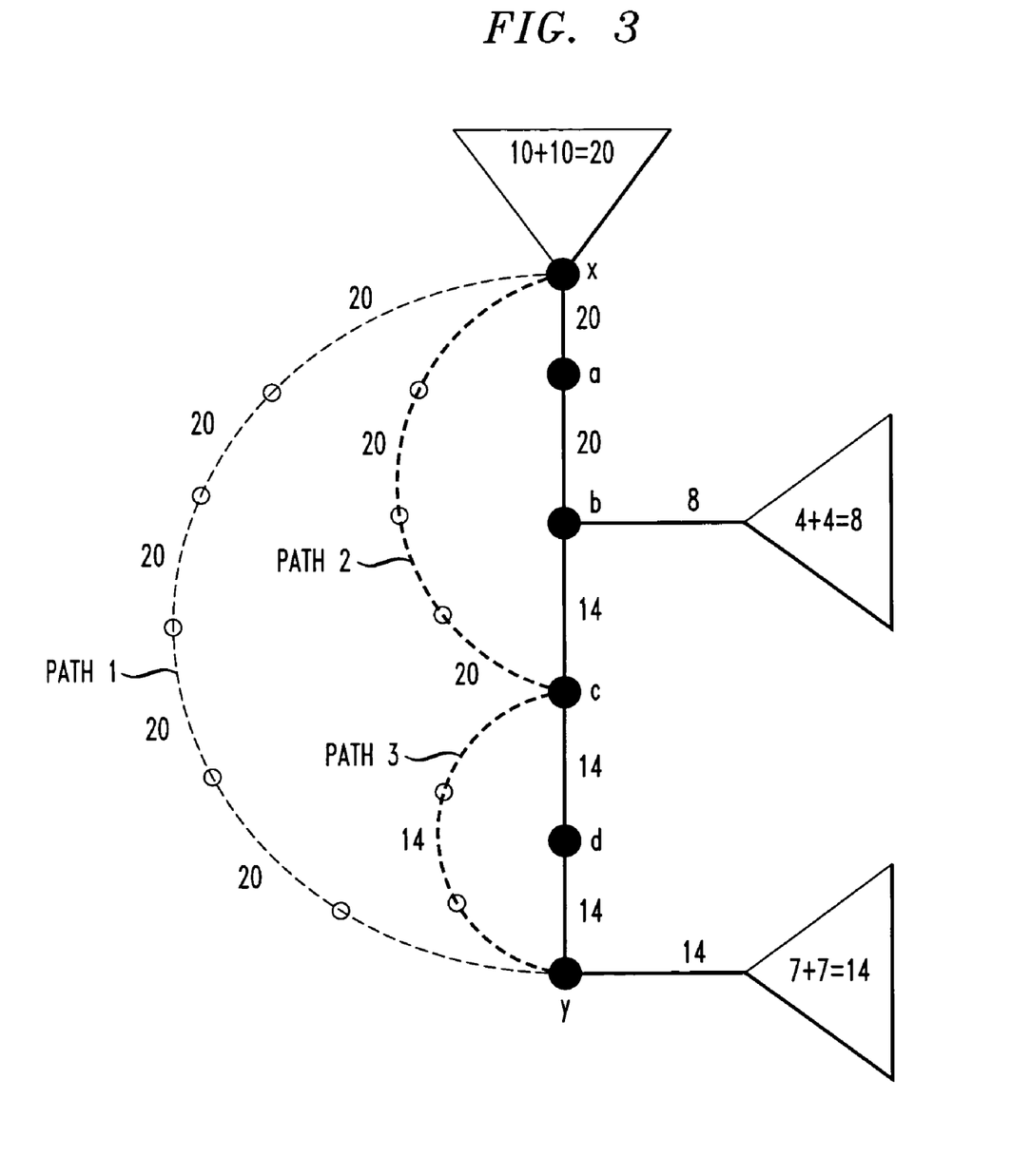
FIG. 3 illustrates exemplary bandwidth reservations for backup paths.

Consider FIG. 3, which depicts a VPN tree having three subtrees (shown as triangles) containing the VPN nodes in W. The subtree rooted at node x has total 10 units of ingress and 10 units of egress aggregate bandwidth requirements. The bandwidth requirement for edge e=(x,a) in this figure is 20 which is the minimum of {20, 22}. Similarly, the bandwidth needed on edge (b,c) is 14 which is the minimum of {28, 14}.

Let f=(u,v) be an edge in G-T such that u,v∈T. Inserting f into T will create a fundamental cycle which will include a set P(f) of primary edges. Note that deleting an edge e in P(f) will still induce a new tree T'=T-e+f connecting nodes in W. Thus, if edge e is deleted from T, then the new tree T'=T-e+f could be used to route the traffic demands, provided that there is enough bandwidth reservation in T'. The edge f is called a candidate backup edge for the edges in P(f). Since a primary edge can occur in multiple fundamental cycles, it may have multiple candidate backup edges. Thus, an edge f∈G-T becomes a backup edge to cover only a subset $\mathcal{P}(f) \subseteq P(f)$ of the primary edges. For example, edge (c,y), shown with a dashed line, is a backup edge for the primary edges (c,d) and (d,y). In the more general case, a backup path $\pi_e \in G-T$ can be used to obtain such a cycle and each edge in the backup path will be a candidate backup edge. In this work, it is considered how to choose minimum cost backup paths $\pi_e \in G-T$ for each e∈T, and to reserve backup bandwidth such that $T'(\pi_e) = (T \cup \pi_e) - \{e\}$ is able to route the demands corresponding to any valid traffic matrix D. This requirement is defined more precisely below.

Let G=(V,E) be a graph and let T⊂G be a VPN tree. An augmentation for T in G is a set of edges $A_T \subseteq E(G)$ such that the following is true:

T∪$A_T$ is 2-edge-connected; and if f∈$A_T$ covers e∈T (i.e., e∈P(f)), then edges of T'=T-e+f have enough bandwidth reservation so that the demands corresponding to any valid traffic matrix D can be routed along T'.

For the sake of notational simplicity, the subscript in $A_T$ will be omitted whenever there is no danger of ambiguity.

Consider the following example. Let T be a tree, and let G be a graph such that V(T)⊂V(G) and E(T)⊂E(G). Let A be an augmentation for T in $\overline{G}$. Let f be an edge in A, let B(f) be the bandwidth requirement of f (i.e., the bandwidth reservation needed for f), and let P(f) be the set of tree edges for which f is a backup edge. Then $$B(f) = \max_{e \in P(f)} \{b_e\}.$$

For example, consider the backup path PATH2 between nodes x and c in FIG. 3 that covers the edges (x,a), (a,b), (b,c). To meet the traffic demands, any edge f in this path will require bandwidth reservation equal to the maximum of the edges in set P(f), which is 20.

A. Cost Function for Augmentation and its Variants

Several cost measures are now listed that can be considered for an optimal augmentation in order to determine a restoration topology. Determining costs of backup edges is one step used during the techniques described below, and any of the following cost measures may be used.

A.1 Cost Function One (CF 1)

One simple special case is to consider an augmentation using the minimum number of edges. Then, an optimization problem is an instance of the unweighted 2-edge-connectivity problem which is known to be NP-complete. S. Khuller and U. Vishkin, "Biconnectivity Approximations and Graph Carvings," Journal of the ACM, vol. 41(2), 214-235 (1994), the disclosure of which is hereby incorporated by reference, provides an algorithm with approximation factor of 1.5.

A.2 Cost Function Two (CF 2)

In this case, an augmentation is found such that the backup bandwidth reserved on edges in the augmentation is minimum. In other words, the optimal augmentation A is desired that minimizes the quantity:

$$w(A) = \sum_{f \in A} B(f).$$

Note that this is more difficult than weighted two-edge-connectivity. For a description of this cost function, see G. Frederickson and J. JaJa, "Approximation Algorithms for Several Graph Augmentation Problems," SIAM Journal of Computing, vol. 10-2, 270-283 (1981), and S. Khuller and R. Thurimella, "Approximation Algorithms for Graph Augmentation," Journal of Algorithms, vol. 14-2, 214-225 (1993), the disclosures of which are hereby incorporated by reference. Indeed, in weighted two-edge-connectivity, the cost of a non-tree edge f is given, while here it depends on which edges are covered by f i.e., on P(f).

A.3 Cost Function Three (CF 3)

A more precise cost function for a backup path is now defined, and this cost function has two components:

(1) the total bandwidth required on the edges of the backup path (backup edge costs); and (2) the total additional bandwidth required on the primary edges (primary edge costs).

The new total bandwidth reservation needed on a primary edge e is denoted by B(3). Let $\delta b_e = |B(e) - b_e|$ the primary edge cost (i.e., additional bandwidth required) for e∈T. Essentially, B(e) is the maximum bandwidth reserved on primary edge e in all the trees $T'(\pi_{e'}) = (T \cup \pi_{e'}) - \{e'\}$, for primary edges e'. Note that $\pi_{e'}$ denotes the backup path for edge e'.

For example, there are two choices in FIG. 3 to cover the edges on the tree path between x and y. One can choose PATH1, or PATH2 and PATH3 together. If one chooses the former, each f∈PATH1 will have B(f)=20 yielding a total cost of 6×20=120 in the backup path. The choice of a backup path may require increasing the bandwidth on the primary edges as well. For example suppose that edge e=(a,b)∈T fails. The maximum bandwidth on this edge is set to 20 which is the total traffic to and from subtree rooted under x. The new path to x in $T'(\pi_e) = (T \cup \pi_e) - \{e\}$ is via the tree edges (b,c), (c,d), (d,y) each of which needs additional 20-14=6 units of bandwidth. Thus the total bandwidth is 120+18=138. If PATH2 and PATH3 are used the total cost would be 20×4+14×3+6=128. Thus we can define a cost measure for a backup path as a linear combination of the two components explained above.

The cost of an augmentation A taking into account bandwidth reservations on both primary as well as backup edges is given by:

$$w(A) = \sum_{f \in A} B(f) + \sum_{e \in T} \delta b_e.$$

Figure 4A:
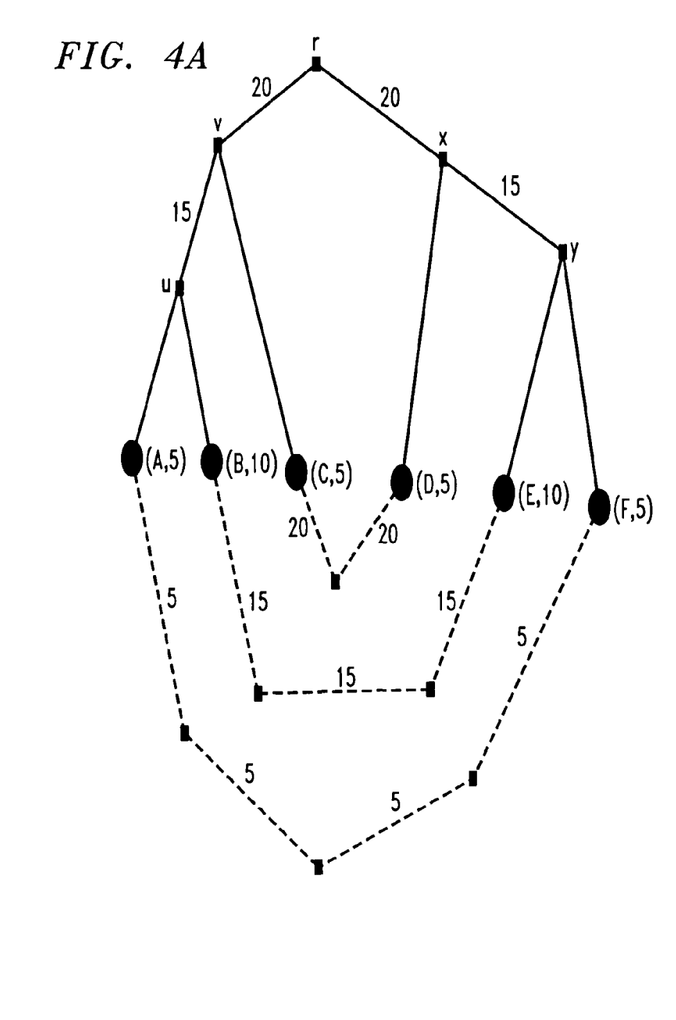
Figure 4B:
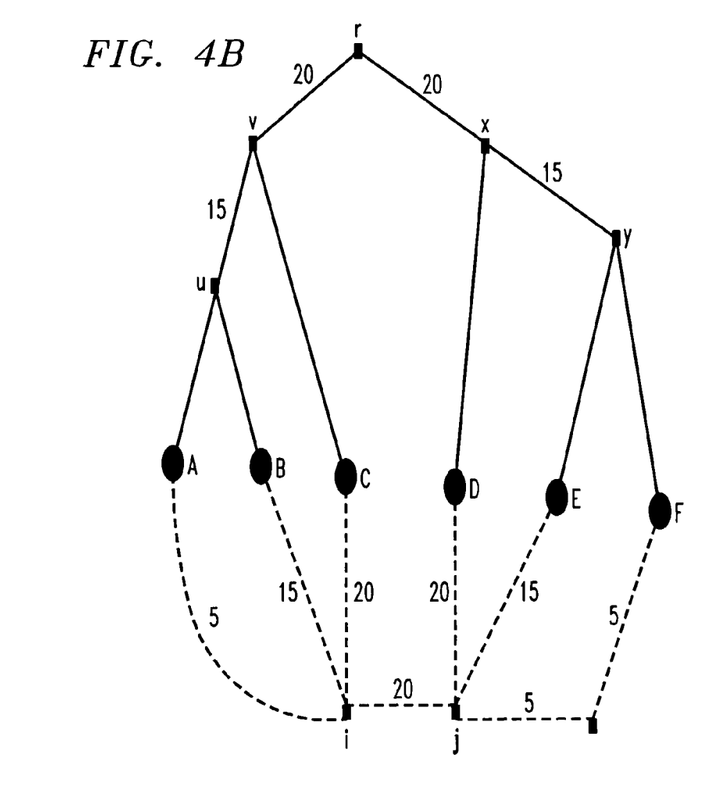
FIG. 4B illustrates an augmentation of the same VPN tree with sharing of backup paths.

There are several trade-offs between these two components, depending on the problem considered. For instance, consider the examples in FIGS. 4A and 4B, which show two augmentation (dashed lines) of the same VPN tree (solid lines) with VPN nodes and their bandwidth requests shown in the parenthesis. Backup path PATH1 in FIG. 4A creates a cycle that includes the edges (A,u), (u,v), (v,r), (r,x), (x,y), (y,F). However, the backup edges in this path are used to cover the edges (A,u) and (y,F) (i.e., ∀f∈PATH1, P(f)={(A,u), (y,F)}). The cost of the first augmentation is 4×5+3×15+2× 20+(5+15+15+5)=145 where the term in parenthesis is the additional bandwidth required for the tree edges. The second augmentation shown in FIG. 4B uses one less edge by sharing (i,j) among all the augmentation paths and has the same total cost of 145. However suppose that VPN nodes C and D increase their bandwidth request to 10 then the cost of augmentation without sharing a backup edge would be 155 while for the augmentation with sharing it would be 160. Thus, it is not always desirable to share the backup edges to obtain an optimal augmentation of a VPN tree.

For the sake of succinctness, in the remainder of this disclosure, cost function CF 2 is used. Cost function CF 2 is an augmentation for which $$w(A) = \sum_{f \in A} B(f)$$

is minimum over all augmentations $A_T$ of T. The techniques disclosed herein for cost function CF 2 can be extended with more sophisticated techniques to the case of cost function CF 3. Additionally, other cost functions such as CF 1 may be used, and the present invention is not to be limited to one particular cost function.

Approximation Methods Providing Restoration in VPNs

In this section, techniques are presented to find a 16-approximation to the optimal augmentation problem for cost function CF 2. The present techniques are, in an exemplary embodiment, based on a sequence of reductions. The high-level ideas behind those reductions are as follows. In the first reduction, the initial graph, G, is used and a graph G', which has no complications arising from path sharing, is determined. G' is obtained from G by replacing entire backup paths with disjoint backup edges. This will cost an approximation factor of 8. Finding an optimal augmentation for G' will still be difficult. In particular, as described above, the cost of a backup edge f in G' still depends on the tree edges that are covered by f. The graph G' will be reduced to another graph Ĝ, such that the cost of each backup edge is fixed and can be computed more easily. This will cost another approximation factor of two. In order to compute the optimal augmentation for T in Ĝ, the two-edge-connectivity augmentation algorithm of Khuller and Thurimella (already incorporated by reference above) will be used.

It can be shown that the edges in the optimal augmentation induce a forest. Next, this property is exploited to produce the first reduction.

Let T be a tree, and let G be a graph such that V(T)⊂V(G) and E(T)⊂E(G). Let X be defined as follows: V(X)=V(T) and there is an edge (u,v) in X if and only if there is a path from u to v in G-T (i.e., a path in G avoiding edges of T). Let G'=T∪X be such that V(G')=V(T) and E(G')=E(T)∪E(X). Thus, G' only contains nodes from T. Further, each non-tree edge F'=(u,v) in G' has a weight $w_f$, which is the number of edges in π(u, v), the shortest path (i.e., the path with minimum number of edges) between nodes u and v in G-T.

Figure 5A:
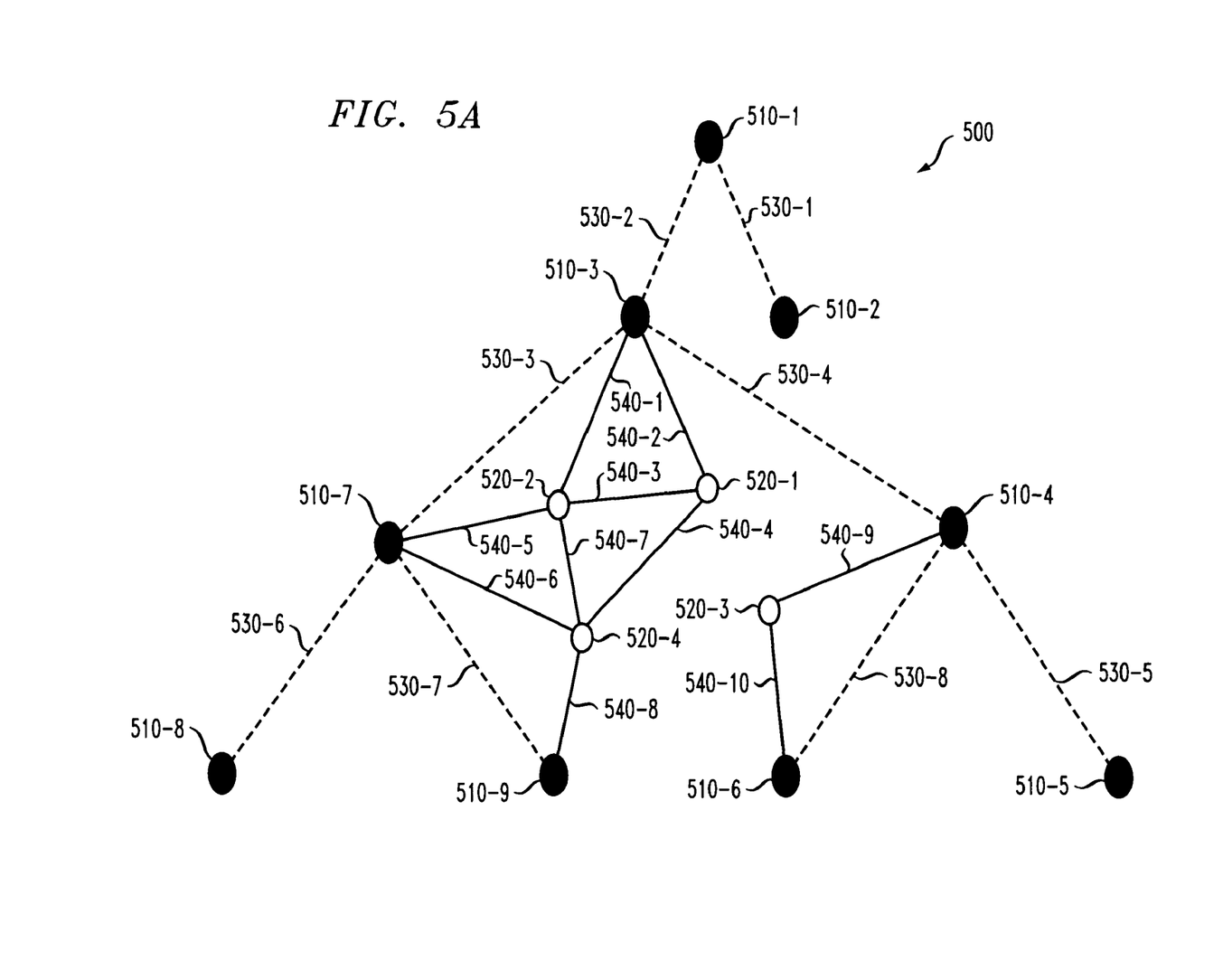
Figure 5B:
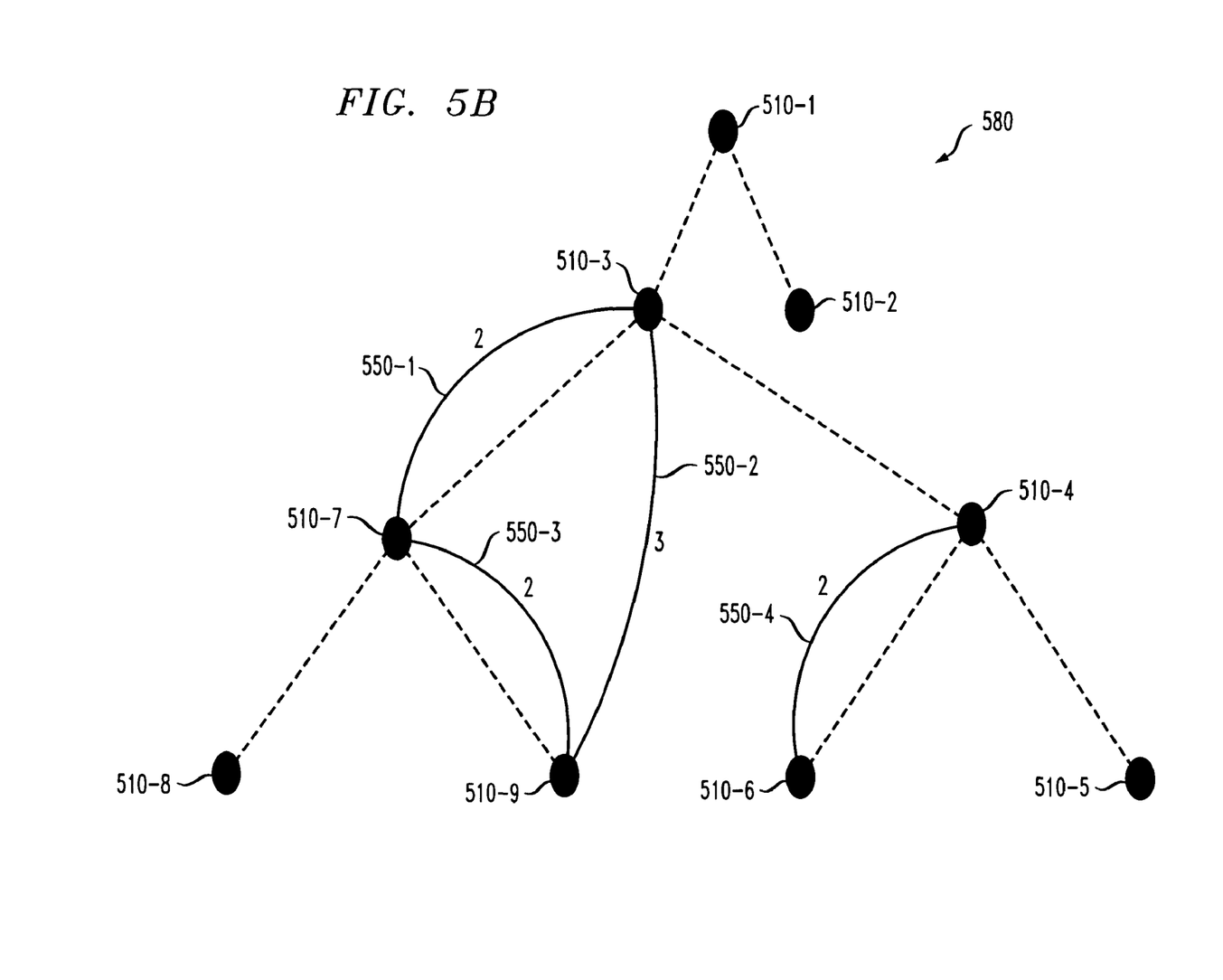
FIG. 5B illustrates a resultant graph after backup edges are added to the initial graph.

FIG. 5B illustrates the graph G' constructed from the graph G depicted in FIG. 5A. In these figures, the nodes of VPN tree T are shaded and tree edges are drawn using dotted lines. Graph G 500 comprises tree nodes 510-1 through 510-9 and tree edges 530-1 through 530-7. Additionally, Graph G 500 comprises non-tree nodes 530-1 through 530-4 and non-tree edges 540-1 through 540-10. As shown in FIG. 5B, graph G' 580 only contains nodes 510 from T; the weights of non-tree edges 540 in G are used to label the backup edges 550. For example, the weight of two is assigned to backup edge 550-1 as the number of non-tree edges 540 making up a shortest path from tree node 510-7 to tree node 510-3. In this case, there are two non-tree edges 540-5 and 540-1 taken. As another example, the weight of three is assigned to backup edge 550-2, which is determined from a shortest path between tree nodes 510-9 and 510-3. There are three non-tree edges 540-8, 540-4, and 540-2 in the shortest path between tree nodes 510-9 and 510-3.

An augmentation A' in G' comprises non-tree edges 540 that cover all the tree edges 530; each non-tree edge 540, f'=(u,v), in A' can serve as a backup edge for any tree edge 530, e, in the unique path between u and v in T. Thus, the cost (for cost function CF 2) of an augmentation A' in G' is given as $$w(A') = \sum_{f' \in A} w_{f'} \cdot B(f'),$$

where A' is a set of non-tree edges in G' and $B(f')=\max_{e \in P(F')} \{b_e\}$. In the remainder of this subsection, it is shown that there is an augmentation A' for T in G' whose cost is within a factor of 8 of the optimal augmentation for T in G.

Let A* be an optimal augmentation for T in G. Suppose each edge e in T is assigned to bins as follows. If the bandwidth be reserved on e satisfies $2^{l-1} < b_e \leq 2^l$, then edge e is assigned to bin l. Let $\beta_l$ denote the set of tree edges assigned to bin l. Also, let L denote the maximum index for a bin to which a tree edge is assigned; that is, for all tree edges e, $b_e \leq 2^L$. Define $A^*_l$ to be the augmentation consisting of edges in A that protect a tree edge in bin l. In other words, if for an edge f∈A*, there exists a tree edge e∈P(f)∩$\epsilon_l$, then f∈$A^*_l$. Furthermore, the bandwidth reserved on each backup edge f in augmentation $A^*_l$ is $2^l$. Clearly, for a tree edge e∈$\beta_l$, since A* contains a backup path for e, augmentation $A^*_l$ must also contain the same backup path for e. Also, since $b_e \leq 2^l$ and the bandwidth reserved on each edge of $A^*_l$ is $2^l$, the backup path in $A^*_l$ has sufficient bandwidth to protect e. Thus, each $A^*_l$ covers all the edges in $\beta_l$, and the augmentations $A^*_0, \ldots A^*_L$ protect all the tree edges. Note that the cost of $A^*_l$ is given by $w(A^*_l)=2^l \cdot |A^*_l|$.

From the above, it follows that the sum of the costs of augmentations $A^*_0, \ldots, A^*_L$ is at most 4·w(A*). In the following, it is shown that for each augmentation $A^*_l$ in G, there exists an augmentation $A'^*_l$ in G' that protects all the tree edges in $\beta_l$ and whose cost is within a factor of two of $w(A^*_l)$.

Let $A'^*_l$ be the edges of an optimal augmentation $A^*_l$ in G' that protect a tree edge in $\beta_l$. Let G' be a graph such that V(T)⊆V(G') and E(T)⊆E(G'). Then, there is an augmentation $A'_l$ that protects edges in $\beta_l$ in G' such that $w(A'_l) \leq 2 \cdot w(A^*_l)$.

Figure 6A:
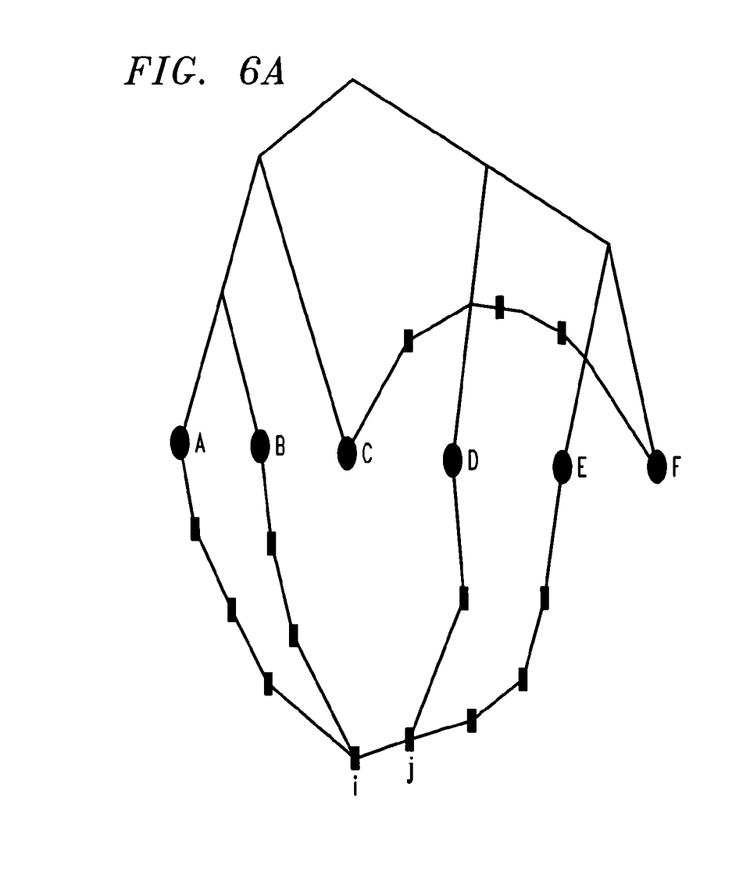

$A^*_l$ is a collection of trees (see e.g., the example in FIG. 6A). Perform a Euler tour on each tree and partition each tour into segments between two nodes in T (see FIG. 6B). Let σ(u,v) be a segment in the Euler tour between nodes u and v in T. Note that σ(u, v) corresponds to a path in G that does not include any tree edges. Thus, replacing segment σ(u,v) with a copy of the shortest path π(u,v) between its endpoints does not affect the two-edge-connectivity between the terminals. So replacing each segment with a copy of the corresponding shortest path in G'−T leaves the terminals still two-edgeconnected. Furthermore, if a bandwidth of $2^l$ is reserved on each edge of every shortest path segment, the sum of bandwidth requirements on all those segments is at most $2 \cdot w(A^*_l)$, since each edge of $A^*_l$ appears twice in the Euler tours and the bandwidth reserved on each edge of $A^*_l$ is $2^l$. Observe that because augmentation $A^*_l$ covers all the tree edges in $\beta_l$, the collection of shortest path segments also protect all the edges in $\beta_l$.

Figure 6B:
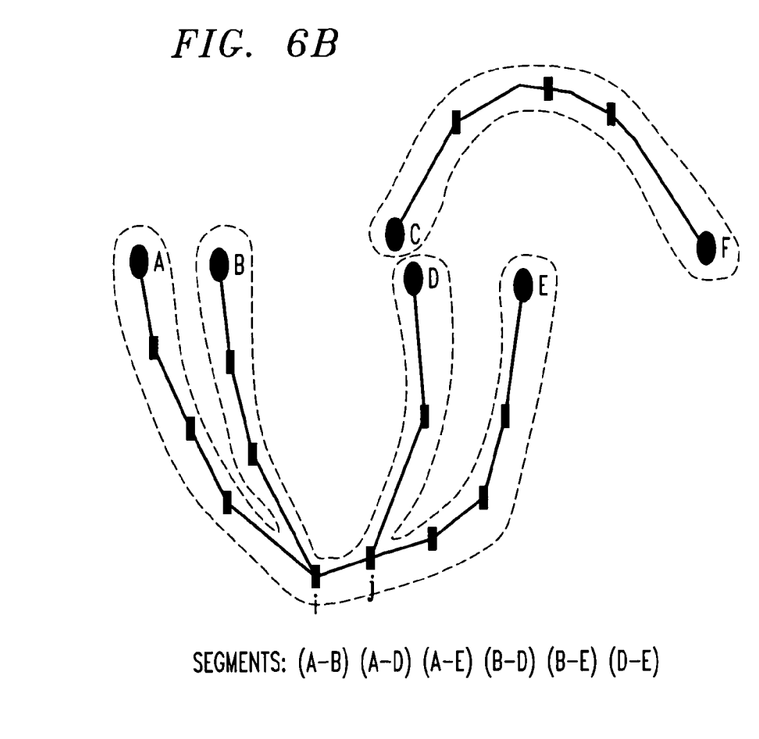
FIG. 6B illustrates the same tree after partitioning in order to show that shortest path determination and replacement do not affect two-edge connectivity between endpoints.

Replacing one segment with an edge between its endpoints is equivalent to shrinking a path of degree-two nodes into one edge. Once again, this does not affect the two-edge-connectivity between the terminals. So replacing each segment $\pi(u,v)$ between nodes u, v in T with the corresponding backup edge $f'=(u,v)$ of $G'-T$ leaves the terminals still two-edge-connected. It can be shown that $w_{f'}$, the weight of $f'$ in $G'$ is equal to the number of edges in $\pi(u,v)$. Also, $P(f')$, the set of tree edges for which $f'$ is a backup edge, comprises all the edges in $\beta_l$ in the unique path between u and v in T.

Thus, the bandwidth requirement of edge $f'$ in $A'_l$ is $B(f')=\max_{e\in P(f')}\{b_e\}$, which can be at most $2^l$. As a result, $w_{f'} \cdot B(f')$, the contribution of edge $f'$ to $w(A'_l)$ is at most the bandwidth requirement of segment $\pi(u,v)$, which is equal to $2^l$ times the number of edges in $\pi(u,v)$. This yields an augmentation $A'_l$ for $\beta_l$ in $G'$, whose total cost is at most $2 \cdot w(A^*_l)$.

It can be shown that there exist augmentations $A'_0, A'_1, \ldots, A'_L$ in $G'$ that protect all edges of T and such that $$\sum_l w(A'_l) \leq 8 \cdot w(A^*).$$

Thus, $A'=\cup_l A'_l$ is an augmentation for T in $G'$ whose cost is within a factor of 8 of the optimal augmentation for T in G. Note that, each edge $f'\in A'$ serves as a backup edge for a tree edge e if and only if it serves as a backup edge for e in some $A'_l$. Thus, the bandwidth reserved on $f'$ in $A'$ is no more than the sum of the bandwidths reserved on it in $A'_0, A'_1, \ldots A'_L$, and $$w(A') \leq \sum_l w(A'_l).$$

The problem of finding an augmentation for T in G has been reduced to that of finding one in $G'$, which is the problem addressed in the following subsection. Using the techniques from the next subsection, an approximate solution will be found for an augmentation $A'$ of T in the graph $G'$ defined above. This augmentation problem is expected to be easier than the original problem, since the edges in $G'$ between nodes of T are disjoint, and thus there are no complications arising from path sharing. Let k be the approximation factor for this (it will be shown later that k=2).

Next, this augmentation $A'$ will be used for $G'$ to construct an augmentation of T in G (the original problem). Illustratively, each edge $f'=(u,v)$ in $A'$ is replaced with the corresponding shortest path $\pi(u,v)$ between nodes u and v in $G-T$. Further, each edge in $\pi(u,v)$ will be a backup edge for all tree edges in $P(f')$, the set of edges protected by $f'$ in $A'$. It can be shown that this will give an approximation factor of $8 \cdot k=16$.

B. Finding an Augmentation for $G'$

In this section, it is shown how to obtain a near-optimal solution to the augmentation problem on $G'$. For the sake of brevity, only the main ideas are described here. Recall that $G'$ consists of VPN tree T plus a set of non-tree edges between pairs of nodes in T. Further, each non-tree edge $f'=(u,v)$ has an associated weight $w_{f'}$, which is the number of edges in $\pi(u,v)$. A non-tree edge $f'=(u,v)$ can serve as a backup edge for any tree edge e in the unique path between u and v in T Thus, the cost (for cost function CF 2) of an augmentation $A'$ in $G'$ is given as $$w(A') = \sum_{f' \in A} w_{f'} \cdot B(f'),$$

where $A'$ is a set of non-tree edges in $G'$ and $b(f')=\max_{e\in P(f')}\{b_e\}$. A goal is to compute the augmentation with the minimum cost.

B.1 Choosing root for tree T

Before presenting techniques for computing a near-optimal augmentation for $G'$, it is shown that T contains a node r(T) that satisfies the following property: let $e_1, \ldots e_k$ be the sequence of edges in T from r(T) to any node v in T. Then, $b_{e_2} \ldots \geq b_{e_k}$. Then r(T) is chosen as the root for tree T.

Recall that the bandwidth requirement for an edge $e=(u,v)\in T$ is given by $b_e=\min\{B_{T_u}, B_{T_v}\}$. In order to show the above property for node r(T), a directed tree $T_{dir}$ is constructed from T by giving a direction to each edge $e=(u,v)$ of T as follows:

If $B_{T_u} < B_{T_v}$, then direct the edge towards u;
If $B_{T_v} < B_{T_u}$, then direct the edge towards v;
If $B_{T_v} = B_{T_u}$, then direct the edge towards the component which contains a particular leaf, say, $\hat{x}$.

Clearly, $T_{dir}$ must contain a node whose indegree is 0 (otherwise, T would contain a cycle). this node in $T_{dir}$ is chosen with no incoming edges as r(T). It can be shown that r(T) is indeed unique and satisfies the above-mentioned property using the following property of $T_{dir}$.

Note that one can easily show that r(T) is unique since every other node in $T_{dir}$ has an edge directed into it (and consequently, an indegree of one). Further, if $r(T)=x_0, x_1, \ldots, x_k=v$ is a tree path from r(T) to v in T involving edges $e_1=(x_0,x_1), e_2=(x_1, x_2), \ldots, e_k=(x_{k-1},v)$, then, $B_{T_{x1}} \geq B_{T_{x2}} \geq \ldots B_{T_{xk}}$. Since $b_{e_i}=B_{T_{xi}}$, it follows that $b_{e_1} \geq b_{e_2} \ldots \geq b_{e_k}$. As described above, r(T) is chosen as the root of T.

B.2 Constructing Graph $\hat{G}$

Next, a graph $\hat{G}$ is formed from $G'$ as follows. The rationale for transforming $G'$ to $\hat{G}$ is that in an augmentation $A'$ for T in $G'$, the cost of a backup edge $f' \in A'$ varies depending on the tree edges covered by f. This makes computing the optimal augmentation in $G'$ difficult. In order to address this problem, each backup edge $\hat{f}=(u,v)$ in the new graph $\hat{G}$ has a fixed cost $c_{\hat{f}}$ and protects all the tree edges along the unique path between u and v. This makes it possible to devise efficient algorithms for computing the optimal augmentation in $\hat{G}$.

In $\hat{G}$, the tree edges in $G'$ are retained without any modifications. However, each non-tree edge in $G'-T$, is replaced by a different set of edges in G. Consider any edge $f'=(u,v)$ in $G'-T$ between two nodes u and v in T, and let lca(u,v) denote the least common ancestor of u and v in T. Also, let $u=u_0, u_1, \ldots, u_p=lca(u,v)$ be the sequence of nodes in T from u to lca(u,v), and $v=v_0, v_1, \ldots, v_q=lca(u,v)$ be the sequence of nodes in T from v to lca(u,v).

Then, perform the following actions for each edge $f'=(u,v)$ in $G'-T'$ to derive $\hat{G}$ from $G'$.

1. Delete edge $f'$ from $G'$.
2. Add edges $\hat{f}_i=(u,v)$ for $i=1, \ldots, p$. Further, assign each edge $\hat{f}_i$ a cost $c_{f_i} \cdot \max_{1 \leq j \leq i}\{b_{(u_{j-1},u_j)}\}$.
3. Add edges $\hat{g}_i=(v,v_i)$ for $i=1, \ldots, q$. Further, assign each edge $\hat{g}_i$ a cost $c_{\hat{g}_i}=w_{f'} \cdot \max_{1 \leq j \leq i}\{b_{(v_{j-1},v_j)}\}$.

In the above set of actions, $w_f$ is the weight of edge f in G' and $b_{(u_{i-1},u_i)}$ is the bandwidth reserved on tree edge $(u_{i-1},u_i)$. Note that it is possible that multiple edges may be added between a pair of nodes u and v in $\hat{G}$. In this case, it is recommended that only the edge (u, v) with the minimum cost is retained, and the remaining edges between the nodes are deleted.

Figure 7:
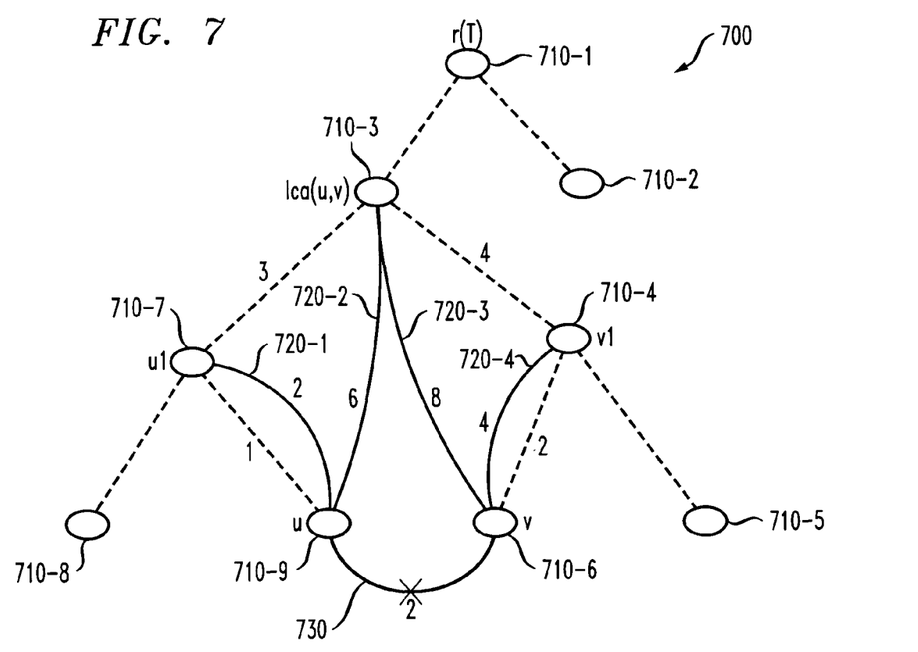
FIG. 7 is an exemplary graph used to illustrate the connection of nodes to least common ancestor nodes through additional backup edges, and the deletion of non-tree edges between nodes.

FIG. 7 illustrates the above set of actions in a graph 700 for non-tree edge 730, f'=(u,v), and having weight $w_f$=2. In the figure, there are tree nodes 710-1 through 710-9 and tree edges that are drawn using dotted lines. The bandwidth reservation for each tree edge is placed next to the tree edge. There is one non-tree edge 730 and four additional backup edges 720-1 through 720-4. Thus, $b_{(u,u_1)}$=1 and $b_{(v,v_1)}$=2. Constructing $\hat{G}$ from G' involves replacing non-tree edge 730 f'=(u,v) with four additional backup edges 720, two from u to $u_1$ and lca(u,v), and another two from v to $v_1$ and lca(u,v). The respective costs for the four additional backup edges 720 are depicted adjacent to the edges 720.

The above actions produce a graph $\hat{G}$ for which T is a spanning tree, and such that non-tree edges can only be backup edges. For instance, if (u,v) is a non-tree edge then either u is an ancestor of v or v is an ancestor of u in T. Further, the cost $c_{\hat{f}}$ of a non-tree edge $\hat{f}$=(u, x) in $\hat{G}$ (generated due to edge f'=(u,v) in G') is essentially the product of $w_f$ and the maximum bandwidth of tree edges between u and x. Thus, selecting edge $\hat{f}$ in $\hat{G}$ is basically equivalent to selecting edge f' in G' as the backup edge for all the tree edges between u and x. Furthermore, since the bandwidth reserved on tree edges is higher for edges closer to the root, the effect of picking any edge f' in G' as a backup edge can be achieved by selecting at most two edges in $\hat{G}$.

An augmentation $\hat{A}$ for T in $\hat{G}$ is a subset of $\hat{G}$-T and has the property that T∪A is two-edge-connected; thus, for every tree edge, $\hat{A}$ contains a backup edge. Further, the cost of $\hat{A}$ in $\hat{G}$ is defined to be $$w(\hat{A}) = \sum_{\hat{f} \in \hat{A}} c_{\hat{f}}.$$

It can be shown that the minimum cost augmentation for T in the graph $\hat{G}$ will yield a solution of cost at most twice the optimal in G'.

Let A' be an augmentation for T in G' with cost w(A'). Then, there is an augmentation $\hat{A}$ for T in $\hat{G}$ such that $w(\hat{A}) \leq 2 \cdot w(A')$. This result can be used to compute an augmentation for T in G' whose cost is at most two times the cost of the optimal augmentation for G'. This is achieved by first computing a minimum cost augmentation for T in $\hat{G}$ using the two-edge-connectivity augmentation algorithm of Khuller and Thurimella (incorporated by reference above and described in the following subsection). Let $\hat{A}$ denote this optimal augmentation. Clearly, $w(\hat{A})$ is within a factor of two of the cost of the optimal augmentation for G'. It is now shown how one can construct an augmentation A' for G' such that $w(A') \leq w(\hat{A})$. For each edge $\hat{f}$=(u,v) in $\hat{A}$ that was added to $\hat{G}$ because of edge f' in G', we simply add to A'. Edge f' serves as the backup edge in A' for all tree edges between nodes u and v. Thus, f's contribution to w(A') is the product of $w_f$ and the maximum bandwidth of tree edges between u and v, which is essentially $c_{\hat{f}}$. Therefore, $w(A') \leq w(\hat{A})$, and A' has a cost that is at most two times the cost of the optimal augmentation for G'.

B.3 Finding Optimal Augmentation for $\hat{G}$

One can compute the minimum cost augmentation for T in $\hat{G}$ using the algorithm of Khuller and Thurimella (incorporated by reference above), which is as follows.

1. Direct all edges of T in $\hat{G}$ towards r(T), the root of T. Set their cost to zero.

2. For every other edge $\hat{f}$=(u,v) in $\hat{G}$-T such that u is an ancestor of v, direct the edge from u to v, and set its cost to $c_{\hat{f}}$.

Find a minimum weight branching in the directed graph rooted at r(T). For each directed edge $\hat{f} \in \hat{G}$-T that is picked as part of the branching, add the (corresponding undirected) edge in $\hat{G}$ to $\hat{A}$.

Figure 8:
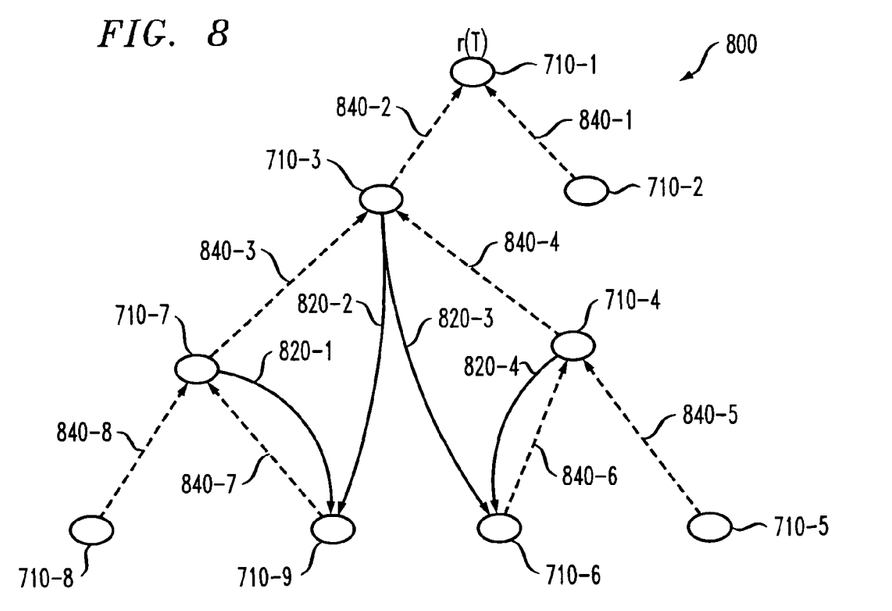
FIG. 8 is an exemplary graph used to illustrate directing tree edges toward a root of a tree and directing additional backup edges away from the root of the tree.

FIG. 8 illustrates a tree 800 created from tree 700 of FIG. 7 after steps 1 and 2 of the above technique have been used. FIG. 8 shows tree edges 840-1 through 840-8 depicted using dotted lines and non-tree edges 820-1 through 820-4 drawn using solid lines.

Experimental results for systems implementing aspects of the present invention and proofs relating to certain of the techniques described herein may be found in G. Italiano, R. Rastogi, and B. Yener, "Restoration Algorithms for Virtual Private Networks in the Hose Model," Proc. of IEEE Infocom (2002), the disclosure of which is hereby incorporated by reference.

It is to be understood that the embodiments and variations shown and described herein are merely illustrative of the principles of this invention and that various modifications may be implemented by those skilled in the art without departing from the scope and spirit of the invention. For example, different costs could be assigned to the additional backup edges. The various assumptions made herein are for the purposes of simplicity and clarity of illustration, and should not be construed as requirements of the present invention.

We claim:

1. In a communication system comprising two or more virtual private network (VPN) endpoints coupled together through a network, the network comprising a plurality of nodes interconnected through edges, a method for providing restoration for the network, the method comprising the steps of:

determining a restoration topology for the network, wherein at least one of the VPN endpoints is adapted to communicate with multiple VPN endpoints through a single connection, wherein the restoration topology comprises backup edges corresponding to primary edges in the network, wherein said restoration topology is based on a hose model, wherein the network further comprises primary nodes, non-primary nodes and non-primary edges, and wherein the step of determining a restoration topology further comprises the step of adding additional backup edges for non-primary edges in the network, each of the additional backup edges connecting a primary node coupled to a non-primary edge with one or more least common ancestor nodes in the network portion; and wherein the step of determining a restoration topology further comprises the step of determining a restoration topology for the network by using a network portion comprising primary edges and primary nodes in the network, the primary edges and primary nodes used to connect the at least one VPN endpoint with other VPN endpoints, and wherein the network further comprises non-primary nodes and non-primary edges, and determining a root node of the network portion;

wherein the root node is chosen such that any sequence of edges in the network portion from the root to any node in the network portion has a property that bandwidth in the sequences decreases;

replacing a given primary edge with one or more of the backup edges if the given primary edge fails; and adding additional backup edges for non-primary edges in the network, each of the additional backup edges connecting a primary node coupled to a non-primary edge with one or more least common ancestor nodes in the network portion.

2. The method of claim 1, wherein the network comprises a plurality of subnetworks.

3. The method of claim 1, wherein the single connection comprises a VPN hose connection.

4. The method of claim 1, wherein the step of determining a restoration topology further comprises the step of determining a restoration topology for the network by using a network portion comprising primary edges and primary nodes in the network, the primary edges and primary nodes used to connect the at least one VPN endpoint with other VPN endpoints.

5. The method of claim 4, wherein the step of determining a restoration topology further comprises the steps of:

finding a shortest path between at least one pair of primary nodes in the network portion, thereby creating one or more shortest paths; and converting each of the one or more shortest paths into a corresponding one of the backup edges.

6. The method of claim 5, wherein the step of determining a restoration topology further comprises the step of assigning weights to each backup edge.

7. The method of claim 6, wherein the step of assigning weights to each backup edge further comprises the steps of determining the weights by determining for each shortest path how many non-primary edges in the graph the shortest path traverses from one node to another node, and setting a weight for a backup edge corresponding to the shortest path as the number of non-primary edges the shortest path traverses from one node to another node.

8. The method of claim 4, wherein the step of determining a restoration topology further comprises the step of determining a root node of the network portion.

9. The method of claim 8, wherein the root node is chosen such that any sequence of edges in the network portion from the root to any node in the network portion has a property that bandwidth in the sequence decreases.

10. The method of claim 1, wherein the step of determining a restoration topology further comprises the step of deleting the non-primary edge.

11. The method of claim 1, wherein the step of determining a restoration topology further comprises the step of assigning a cost to each of the additional backup edges.

12. The method of claim 3, wherein a given node in the network portion is coupled to one or more given primary edges and one or more given non-primary edges, wherein the step of determining a restoration topology further comprises the steps of assigning weights to each additional backup edge, and wherein the cost for an additional backup edge for the given primary node comprises a value of a multiplication of a weight assigned to a given primary edge corresponding to a given non-primary edge and a maximum bandwidth for each of the one or more given primary edges.

13. The method of claim 1, wherein the step of adding additional backup edges for non-primary edges in the graph creates a resultant graph comprising the primary nodes, the primary edges, the backup edges and the additional backup edges, and wherein the step of determining a restoration topology further comprises the step of determining a two-edge connected graph for the resultant graph.

14. In a communication system comprising two or more virtual private network (VPN) endpoints coupled together through a network, the network comprising a plurality of nodes interconnected through edges, an apparatus providing restoration for the network, the apparatus comprising:

a memory;

a network interface; and at least one processor, coupled to the memory and network interface, operative to:

determine a restoration topology for the network, wherein at least one of the VPN endpoints is adapted to communicate with multiple VPN endpoints through a single connection, and wherein the restoration topology comprises backup edges corresponding to primary edges in the network, wherein said restoration topology is based on a hose model, wherein the network further comprises primary nodes, non-primary nodes and non-primary edges, and wherein the step of determining a restoration topology further comprises the step of adding additional backup edges for non-primary edges in the network, each of the additional backup edges connecting a primary node coupled to a non-primary edge with one or more least common ancestor nodes in the network portion; and replace a given primary edge with one or more of the backup edges if the given primary edge fails.

15. An article of manufacture providing restoration for a network coupling two or more virtual private network (VPN) endpoints coupled together, the network comprising a plurality of nodes interconnected through edges, the article of manufacture comprising:

a non-transitory machine readable medium containing one or more programs which when executed implement the steps of:

determining a restoration topology for the network, wherein at least one of the VPN endpoints coupled through the network is adapted to communicate with multiple VPN endpoints through a single connection, and wherein the restoration topology comprises backup edges corresponding to primary edges in the network, wherein said restoration topology is based on a hose model, wherein the network further comprises primary nodes, non-primary nodes and non-primary edges, and wherein the step of determining a restoration topology further comprises the step of adding additional backup edges for non-primary edges in the network, each of the additional backup edges connecting a primary node coupled to a non-primary edge with one or more least common ancestor nodes in the network portion; and replacing a given primary edge with one or more of the backup edges if the given primary edge fails.

* * * * *

UNITED STATES PATENT AND TRADEMARK OFFICE
CERTIFICATE OF CORRECTION

| | | |
|---|---|---|
| PATENT NO. | : 8,028,050 B2 | |
| APPLICATION NO. | : 10/462215 | |
| DATED | : September 27, 2011 | |
| INVENTOR(S) | : Giuseppe F. Italiano | |

It is certified that error appears in the above-identified patent and that said Letters Patent is hereby corrected as shown below:

In the Claims:

In column 14, for claim 1, lines 59-67 should be deleted.

In column 14, for claim 1, line 37, should read: In a communication system comprising two or more virtual private network (VPN) endpoints coupled together through a network, the network comprising a plurality of nodes interconnected through edges, a method for providing restoration for the network, the method comprising the steps of: determining a restoration topology for the network, wherein at least one of the VPN endpoints is adapted to communicate with multiple VPN endpoints through a single connection, wherein the restoration topology comprises backup edges corresponding to primary edges in the network, wherein said restoration topology is based on a hose model, wherein the network further comprises primary nodes, non-primary nodes and non-primary edges, and wherein the step of determining a restoration topology further comprises the step of adding additional backup edges for non-primary edges in the network, each of the additional backup edges connecting a primary node coupled to a non-primary edge with one or more least common ancestor nodes in the network portion; and replacing a given primary edge with one or more of the backup edges if the given primary edge fails.

In column 15, for claim 1, lines 1-4 and 7-11 should be deleted.

In column 15, for claim 1, in line 6, "fails; and" should be replaced by -- fails. --.

In column 15, line 54, in claim 12, "3" should be replaced by -- 11 --.

Signed and Sealed this
Twenty-seventh Day of December, 2011

David J. Kappos
*Director of the United States Patent and Trademark Office*